US012417905B2

(12) United States Patent
Zhang

(10) Patent No.: US 12,417,905 B2
(45) Date of Patent: Sep. 16, 2025

(54) CYCLOIDAL MASS SPECTROMETER AND METHOD FOR ADJUSTING RESOLUTION THEREOF

(71) Applicant: Shimadzu Corporation, Kyoto (JP)

(72) Inventor: Xiaoqiang Zhang, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 403 days.

(21) Appl. No.: 18/140,771

(22) Filed: Apr. 28, 2023

(65) Prior Publication Data

US 2023/0352292 A1 Nov. 2, 2023

(30) Foreign Application Priority Data

Apr. 29, 2022 (CN) ......................... 202210475642.1

(51) Int. Cl.
*H01J 49/32* (2006.01)

(52) U.S. Cl.
CPC .................................. *H01J 49/328* (2013.01)

(58) Field of Classification Search
USPC ......................................................... 250/297
See application file for complete search history.

(56) References Cited

U.S. PATENT DOCUMENTS

| | | | | | |
|---|---|---|---|---|---|
| 3,497,688 | A * | 2/1970 | Brown | H01J 49/328 | 250/290 |
| 6,617,576 | B1 * | 9/2003 | Voss | H01J 49/328 | 250/284 |
| 6,815,674 | B1 * | 11/2004 | Voss | B01D 59/48 | 250/296 |

* cited by examiner

*Primary Examiner* — Kiet T Nguyen
(74) *Attorney, Agent, or Firm* — Troutman Pepper Locke LLP; Tim Tingkang Xia, Esq.

(57) ABSTRACT

The invention provides a cycloidal mass spectrometer and a method for adjusting resolution thereof. The spectrometer comprises a set of magnets, providing a magnetic field; two sets of electrode arrays, opposing to each other parallelly, each set of the electrode array including a plurality of strip electrodes arranged parallelly; at least one DC power supply, providing DC voltages to each set of the electrode array to form a DC electric field, the direction of the electric field being perpendicular to the direction of the magnetic field, and the electric field and the magnetic field superimposed on each other to form an electric-magnetic cross-field; an ion injection unit, configured to inject ions into the electric-magnetic cross-field. Said ions travel along a cycloidal trajectory in the electric-magnetic cross-field, in which the magnetic field intensity and the electric field intensity decrease simultaneously within at least part of the region in said cycloidal trajectory.

12 Claims, 9 Drawing Sheets

CYCLOIDAL MASS SPECTROMETER AND METHOD FOR ADJUSTING RESOLUTION THEREOF

CROSS-REFERENCE TO RELATED PATENT APPLICATION

This application claims priority to and the benefit of Chinese Patent Application Serial No. 202210475642.1, filed Apr. 29, 2022, which is incorporated herein in its entirety by reference.

FIELD OF THE INVENTION

The present invention relates to an analytical instrument, in particular a cycloidal mass spectrometer and a method for adjusting resolution thereof.

BACKGROUND OF THE INVENTION

A cycloidal mass analyzer or a cycloidal mass spectrometer composed thereof is a type of magnetic mass spectrometry, the basic principle of which has been proposed by Bleakney and Hipple in 1938. The cycloidal mass spectrometer internally distributes a magnetic field and an electric field (EB) that are uniform and orthogonal to each other, the motion trajectory of the ion to be analyzed being cycloid after entering the orthogonal field; whereas the pitch of the cycloid is determined by the mass-to-charge ratio of the ion m/z, and thus can be used for ion mass analysis. The most prominent characteristic of cycloidal mass spectrometers is the so-called "perfect focusing" characteristic in the cycloid plane, i.e.: the pitch of the ion trajectory (or focus position) is independent of the divergence of the velocity magnitude and direction of the incident ion beam; even if there is a wide spread in the velocity magnitude and direction of the incident ion beam, after each pitch, the ion beam is refocused to almost exactly the same size as the original ion beam. This is also an important advantage over other double-focus magnetic mass spectra, which tend to focus only a very small range of velocity divergence.

However, cycloidal mass spectrometers have never gained emphasis over the last 80 years. The main reason is that cycloidal mass spectrometers require very uniform magnetic and electric fields to guarantee resolution; achieving a uniform magnetic field is rather difficult and often requires huge and bulky magnets. Another reason is that cycloidal mass spectrometers focus ions only in the cycloid plane and do not bind the ions in a direction perpendicular to the cycloid plane. The resulting divergence of the ion beam allows the proportion of ions that can reach the detector to be relatively low and the sensitivity of the instrument to be greatly limited. Compared to mass spectrometers using other kinds of mass analyzers, such as ion traps, quadrupoles, time-of-flight mass spectrometers or the like, the performance of cycloidal mass spectrometers at the same volume and weight is often too low to be competitive.

SUMMARY OF THE INVENTION

In view of the above problems, the present invention provides a cycloidal mass spectrometer and a method for adjusting resolution thereof capable of solving both the miniaturization, resolution and sensitivity problems of the cycloidal mass spectrometer.

The present invention provides a cycloidal mass spectrometer comprising: a set of magnets, providing a magnetic field; two sets of electrode arrays, opposing to each other parallelly, each set of the electrode array including a plurality of strip electrodes arranged parallelly; at least one DC power supply, providing DC voltages to each set of the electrode array to form a DC electric field, the direction of the electric field being perpendicular to the direction of the magnetic field, and the electric field and the magnetic field superimposed on each other to form an electric-magnetic cross-field; an ion injection unit, configured to inject ions into the electric-magnetic cross-field, wherein said ions travel along a cycloidal trajectory in the electric-magnetic cross-field, in which the magnetic field intensity and the electric field intensity decrease simultaneously within at least part of the region in said cycloidal trajectory.

According to the technical solution, due to the non-uniformity of the magnetic field, the field intensity in the central area of the magnetic field is stronger and more uniform, whereas the intensity of the magnetic field is reduced at the outer region, the broadening of the ion beam due to the non-uniformity of the magnetic field is compensated by reducing the intensity of the electric field in the area of at least part of the cycloidal trajectory of the ion so that smaller magnets can be used to achieve the same or even better resolution than in the case of a uniform magnetic field. In addition, a radial reduction in magnetic field intensity will lead to an axial confining force field, so that ions can be focused in the axial direction, which can significantly improve the efficiency of ion transfer and the detection sensitivity.

In an alternative technical solution of the present invention, in the direction from central area to outer area of the ions' cycloidal trajectory, relative non-uniformity of the electric field formed by reduction of the electric field intensity is higher than relative non-uniformity of the magnetic field formed by reduction of the magnetic field intensity.

According to this technical solution, the construction of the electric field is relatively easy compared to the construction of the magnetic field, such as by adjusting the shape of the electrodes and adjusting the voltage applied to the electrodes to construct a desired electric field, so that the relative non-uniformity of the electric field can be flexibly adjusted according to the relative non-uniformity of the magnetic field to obtain a better compensation effect and a better resolution.

In an alternative technical solution of the invention, the relative non-uniformity of the electric field is twice of that of the magnetic field. In this case, the resolution of the mass spectrometer is not constrained by the non-uniformity of the electric-magnetic cross-field, and the mass spectrometer has a higher resolution.

In an alternative technical solution of the invention, the magnets are magnetic poles of a pair of permanent magnets, and each of the magnetic poles has a length of no more than 150 mm, a width of no more than 150 mm and a thickness of no more than 20 mm.

According to this solution, the size of the magnetic poles is small, which is suitable for miniaturized fabrication of cycloidal mass spectrometers.

In an alternative technical solution of the present invention, each of the magnetic poles has a length of no more than 60 mm, a width of no more than 60 mm and a thickness of no more than 15 mm.

According to this solution, the size of the magnetic poles is smaller, which is more suitable for miniaturized fabrication of cycloidal mass spectrometers.

In an alternative technical solution of the invention, the electric field intensity in the outer area of the ions' cycloidal trajectory is lower than that in the central area of the ions' cycloidal trajectory.

According to this solution, the reduction of the magnetic field intensity in the radial direction brings about a confining force field in the axial direction, so that the ions can be focused in the axial direction, thereby significantly improving the transfer efficiency of the ions and the sensitivity.

In an alternative technical solution of the invention, each set of the electrode array is segmented along the elongated strip electrodes, and the electric field intensity varies in the direction of the electric field by means of applying different DC voltages to segments of the electrode array.

According to this solution, the desired electric field is constructed by adjusting the voltage applied to the electrodes in a simple manner, and the electric field intensity can be flexibly adjusted to match the magnetic field intensity, thereby obtaining a better compensation effect.

In an alternative embodiment of the invention, the ions' cycloidal trajectory is a cycloidal trajectory having a plurality of periods.

According to this solution, the resolution of the mass spectrometer is improved per one cycle of ion movement, and cycloidal trajectories over multiple cycles are advantageous to significantly increase the resolution of the mass spectrometer.

An alternative embodiment of the present invention comprises a plurality of slits arranged in the ions' cycloidal trajectory.

According to this solution, the plurality of slits facilitates the simultaneous detection of a plurality of ions, and the number of species of detected ions can be flexibly adjusted as desired.

An alternative technical solution of the present invention includes an ion source located upstream of the ion injection unit, and a detector located downstream of the ions' cycloidal trajectory.

In an alternative technical solution of the present invention, a control unit for adjusting dynamically the resolution of a mass spectrum is included, the ion signal detected by the detector is transmitted to a computer to obtain the mass spectrum, and the control unit adjusts the DC voltage value applied to the electrode array according to the resolution of the mass spectrum, until the resolution of the cycloidal mass spectrometer reaches a predetermined value.

According to this solution, the spectral resolution is further adjusted by varying the DC voltage applied to the electrode array until the resolution reaches a predetermined desired value.

The present invention further provides a method for adjusting resolution of a cycloidal mass spectrometer, comprising the steps of:

- producing, by the ion source, ions to be analyzed;
- the ions to be analyzed entering the electric-magnetic cross-field, and moving along the ions' cycloidal trajectory in the electric-magnetic cross-field and reaching the detector to generate ion signal;
- transmitting the ion signal detected by the detector to the computer and conducting a data processing by the computer to obtain the mass spectrum;
- adjusting dynamically, by the control unit, the DC voltage value applied to each strip electrode of each set of the electrode array according to the resolution of the mass spectrum, and repeating all of the above steps until the resolution reaches the predetermined value.

REFERENCE NUMERALS

Figure 1:
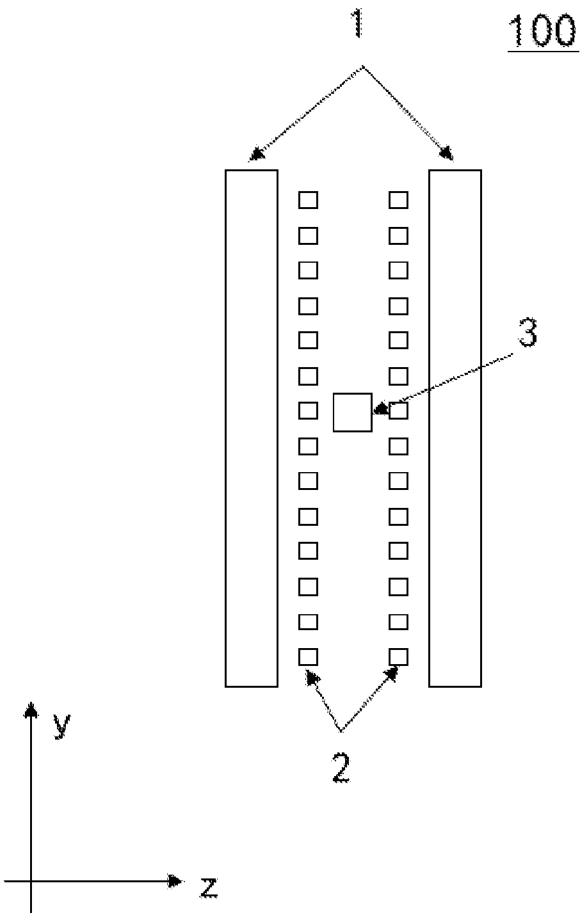
FIG. 1 is a schematic view showing the structure of a cycloidal mass spectrometer in the plane yz according to a first embodiment of the present invention.

Cycloidal mass analyzer 100; Magnet 1; Electrode array 2; Strip electrode 21; Ion injection unit 3; Ions' cycloidal trajectory 4; Detector 5; Ion source 6; Computer 7; Control unit 8; DC power supply 9.

DETAILED DESCRIPTION OF THE INVENTION

The technical solutions in the embodiments of the present invention will be clearly and completely described below in conjunction with the accompanying drawings in the embodiments of the present invention, and it is obvious that the described embodiments are only a part of the embodiments of the present invention, rather than all of the embodiments. On the basis of the embodiments in the present invention, all other embodiments obtained by those of ordinary skill in the art without making inventive labor fall within the scope of protection of the present invention.

Figure 2:
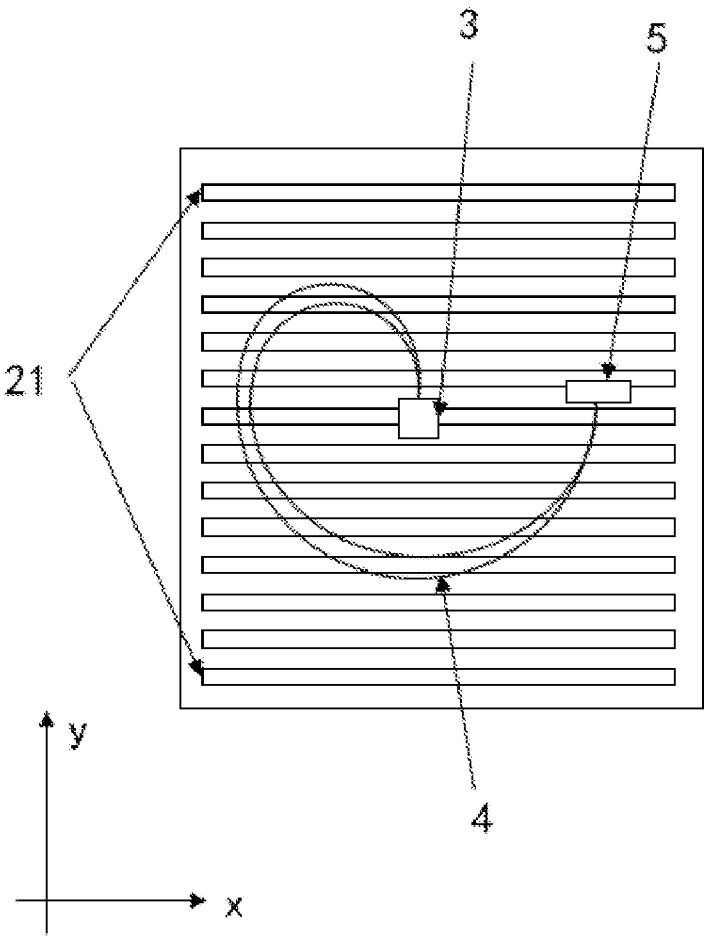
FIG. 2 is a schematic view showing the configuration of a cycloidal mass spectrometer in the plane xy according to the first embodiment of the present invention.

Referring to FIGS. 1 and 2, the present invention provides a cycloidal mass analyzer 100 comprising: a set of magnets 1, providing magnetic field; two sets of electrode arrays 2, opposing to each other parallelly, each set of the electrode array 2 including a plurality of strip electrodes 21 arranged parallelly; at least one DC power supply 9 (not shown in FIG. 1, see FIG. 16), providing DC voltage to each set of the electrode array 2 to form DC electric field, the direction of the electric field being perpendicular to the direction of the magnetic field, and the electric field and the magnetic field superimposed on each other to form an electric-magnetic cross-field; an ion injection unit 3, configured to inject ion into the electric-magnetic cross-field, whereby moving along ions' cycloidal trajectory 4 in the electric-magnetic cross-field, the magnetic field intensity and the electric field intensity decreasing simultaneously within at least part of the area in the ions' cycloidal trajectory 4.

In the above manner, due to the non-uniformity of the magnetic field, the field intensity in the central area of the magnetic field is stronger and more uniform, whereas the intensity of the magnetic field is reduced at the outer area, the spread width of the ion beam due to the non-uniformity of the magnetic field is compensated by reducing the intensity of the electric field in the area of at least part of the cycloidal trajectory of the ion so that smaller magnets can be used to achieve the same or even better resolution than in the case of a uniform magnetic field. In addition, a radial (the direction y) reduction in magnetic field intensity will lead to an axial confining force field, so that ions can be focused in the axial direction (the direction Z), which can significantly improve the efficiency of ion transfer and the sensitivity of the final detection.

Specifically, the basic theoretical equation for the cycloidal mass analyzer 100 to perform mass spectrometry is:

$$d = \frac{m}{z}\frac{2\pi E}{B^2} \tag{1}$$

where, E is the electric field intensity, B is the magnetic field intensity (magnetic induction strength), and d is so-called "pitch". Ions of different m/z have different pitches under the same E×B field so that mass spectra can be obtained using an array detector 5, but more often the method is to scan the electric field E so that ions of different m/z pass sequentially through an exit slit to a single point detector 5 to obtain mass spectra. If the initial spread width Δd of an ion, under a uniform magnetic field B and electric field E, the mass spectral resolution R of the ion after passing through one pitch is $$R = \frac{d}{\Delta d} \tag{2}$$

From equation (2), the resolution of the mass spectrum depends on the initial spread width Δd and the pitch d of the ion beam; the initial spread width Δd is determined by the entrance slit, while the pitch d is determined by the electric field intensity. In the case where the non-uniformity of the magnetic field B and the electric field E is relatively small, the following formula can be obtained from formulae (1) and (2)

$$R \propto \frac{E}{\Delta E} \text{ and } R \propto \frac{B}{2\Delta B} \tag{3}$$

Therefore, obtaining a high resolution requires a very uniform field, as reported for example in the document "J. Am. Soc. Mass Spectrom. 2018, 29, 2, 352-359", using a magnetic field of 110*90 mm, a magnetic field with a variation (or called "relative non-uniformity") of <1% in the central area 43*46 mm can be obtained, the trajectory of the ions needs to be confined within the central area in order to obtain a good resolution. With conventional H-type magnet designs, the total weight of the magnet may exceed 9 kg. Even so, the resolution does not exceed 100 for ions with m/z=20. Such performance is difficult to compete with mass analyzers such as an ion trap.

However, the inventor realized that the resolution is not related to the non-uniformity of the E×B field over the full area, but rather to the non-uniformity of the E×B field over the area where the ion trajectory is located, and more precisely, to the non-uniformity of the E×B field over the width of the ion beam for ions of the same m/z along the cycloidal trajectory. That is, even though the E×B field is non-uniform over the full field area, i.e., the field experienced by a single ion during flight is non-uniform, if the spread width of the ion beam is not large, the resolution is not necessarily affected; further, by using a dedicated designed, non-uniform electric field, it is possible to compensate the ion beam spreading due to the non-uniformity of the magnetic field, so that smaller magnets can be used with the same or even better resolution than in the case of a uniform field. Also the following formula can be obtained from formulae (1) and (2), $$R = \frac{d}{\Delta d} = \frac{d}{\frac{\partial d}{\partial E}\Delta E + \frac{\partial d}{\partial B}\Delta B} = \frac{1}{\frac{\Delta E}{E} - \frac{2\Delta B}{B}} \tag{4}$$

According to formula (4), when the difference of $$\frac{\Delta E}{E} - \frac{2\Delta B}{B}$$

gets close to 0, the resolution R gets higher, accordingly, in a preferred embodiment of the present invention, the relative non-uniformity of electric field $$\frac{\Delta E}{E}$$

($\Delta E$ being the amount of variation in electric field intensity) is higher than the relative non-uniformity of magnetic field $$\frac{\Delta B}{B}$$

($\Delta B$ being the amount of variation in magnetic field intensity), mainly because of that the construction of the electric field is relatively easy compared to the construction of the magnetic field, such as by adjusting the shape of the electrodes and adjusting the voltage applied to the electrodes to construct a desired electric field, so that the relative non-uniformity of the electric field can be flexibly adjusted according to the relative non-uniformity of the magnetic field to obtain a better compensation effect and a better resolution. Further, when satisfied $$\frac{\Delta E}{E} = \frac{2\Delta B}{B},$$

i.e., the relative non-uniformity of the electric field is twice of that of the magnetic field, the resolution will no longer be constrained by the E×B field non-uniformity.

In a preferred embodiment of the invention, the magnets are magnetic poles of a pair of permanent magnets, and each of the magnetic poles has a length of no more than 150 mm, a width of no more than 150 mm and a thickness of no more than 20 mm. The embodiments of the present invention achieve higher resolution by compensating the non-uniformity of the magnetic field with an electric field, and thus require relatively low uniformity to the magnetic field, do not require the use of a large volume of the magnetic field, and thus are suitable for miniaturization of cycloidal mass spectrometer. Further, each of the magnetic poles has a length of no more than 60 mm, a width of no more than 60 mm and a thickness of no more than 15 mm. Embodiments of the present invention allow for the use of smaller magnetic poles, allowing for miniaturization of cycloidal mass spectrometer.

Figure 3:
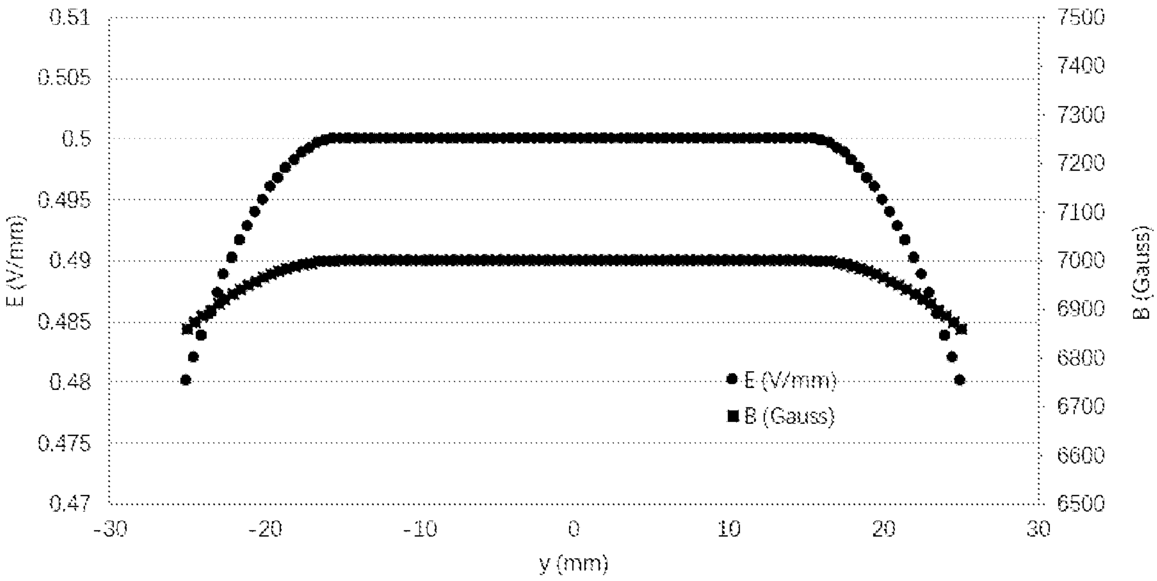
FIG. 3 is a diagram showing the distribution of electric field intensity and magnetic field intensity in the first embodiment of the present invention.

As shown in FIG. 3, the relative non-uniformity of the magnetic field is about 2% within a distance of 50 mm along the y-axis direction. The electric field is obtained by applying a voltage across each strip electrode 21. If a uniform voltage-dividing resistor chain is used, a relatively uniform electric field can be obtained except in the outer area. In the present invention, by adjusting the voltage of each strip electrode 21, an electric field distribution as in FIG. 3 can be obtained with a relative non-uniformity of the electric field of about 4% within a distance of 50 mm in the y-axis direction, i.e., a relative non-uniformity of the electric field is 2 times of the relative non-uniformity of the magnetic field. In this manner, when ions approach the upper and lower edge areas of the E×B field, the resolution will not be degraded due to variations in the E×B field.

The results of computer simulations show that with an entrance slit of 100 μm, a magnetic field intensity of 0.7 T, the structure can achieve a resolution of around 500 for ions with m/z=500, i.e. essentially a unit mass resolution. If conventional uniform voltage-dividing resistor chain is used, the resolution is only about 300. In addition, the magnetic field has a variation in intensity in the plane xy (or along the radial direction), such as a decrease in the field intensity in the outer area. The decrease in the field intensity in the radial direction will lead to a confining force field in the axial direction (i.e., direction z), so that the ions can be focused in the direction z, which can significantly increase the efficiency of ion transfer and the detection sensitivity.

In a preferred embodiment of the invention, the electric field intensity in the outer area of the ions' cycloidal trajectory 4 is lower than that in the central area of the ions' cycloidal trajectory 4. The ions can be confined in the central area of the electric field, thereby obtaining better resolution.

In a preferred embodiment of the present invention, multiple slits arranged on the ions' cycloidal trajectory 4 are included. Multiple slits can facilitate detection of multiple ions simultaneously, allowing flexibility in adjusting the number of species detected as needed.

Second Embodiment

Figure 4:
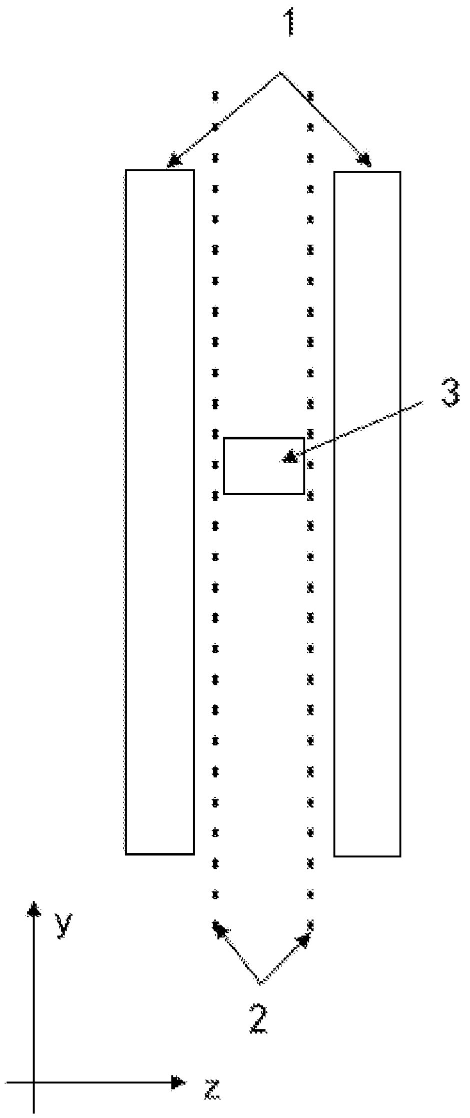
FIG. 4 is a schematic view showing the structure of the plane yz of a cycloidal mass spectrometer according to a second embodiment of the present invention.
Figure 5:
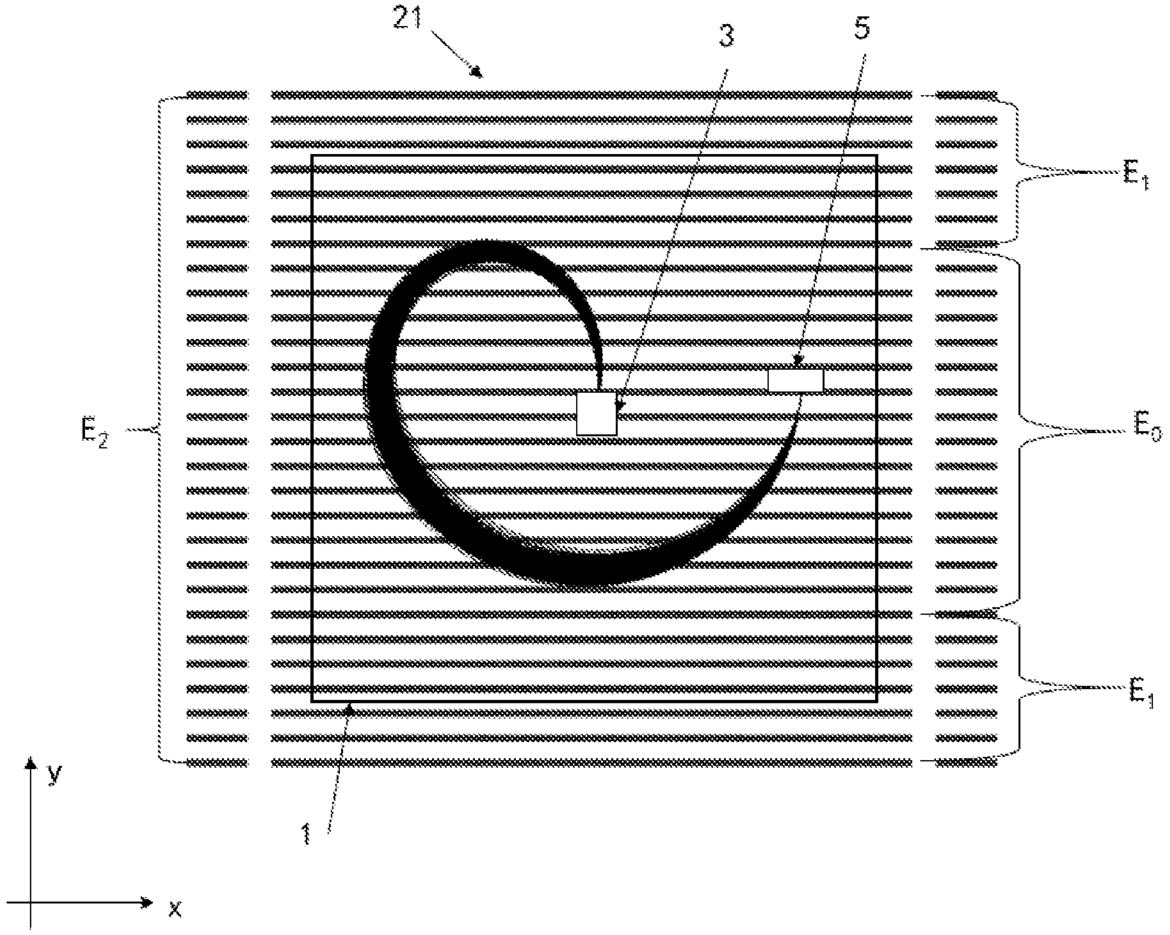
FIG. 5 is a schematic view showing the configuration of a cycloidal mass spectrometer in the plane xy according to the second embodiment of the present invention.

Referring to FIGS. 4 and 5, in a second embodiment of the invention, there is provided a cycloidal mass analyzer 100, similar to the structure of the cycloidal mass analyzer 100 of the first embodiment, differently, in the second embodiment of the present invention, in order to further reduce the size of the magnet 1, each set of electrode arrays 2 is segmented in the direction along which the strip-shaped electrodes 21 extend, and by applying a different DC voltage to each segment of the electrode arrays 2, the electric field intensity in the direction of the electric field is varied. By adjusting the voltage applied to the electrodes to build up the desired electric field in a simple manner, the electric field intensity can be flexibly adjusted to match the magnetic field intensity in order to obtain a better compensation effect.

In a second embodiment of the present invention, the relative non-uniformity of the magnet 1 is compensated with the electric field along the x-axis direction by adding a set of electrodes on each of the left and right sides of each set of electrode arrays 2 in the x-axis direction so that the size of the magnet 1 is reduced to a length of no more than 40 mm, a width of no more than 40 mm, and a thickness of no more than 10 mm.

As shown in FIG. 5, three different electric field distributions along the y-direction are formed by applying voltages, $E_0$ being the electric field intensity of the center field, $E_1$ being the electric field intensity of the upper and lower edges (along the y-axis), and $E_2$ being the electric field intensity of the left and right edges (along the x-axis). Thus, adjusting the values of $E_0$, $E_1$ and $E_2$ optimizes the electric field distribution while achieving electric field compensation in both x, y directions.

Figure 6:
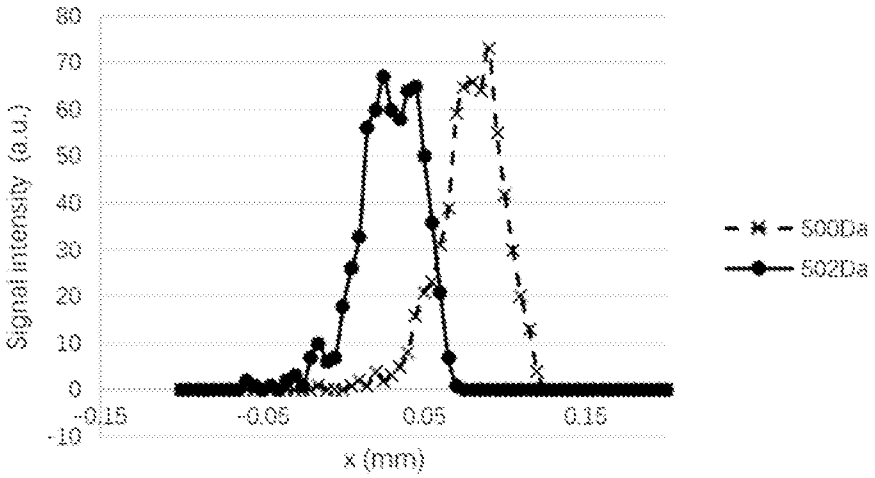
FIG. 6 is a schematic drawing showing a mass spectrum obtained from computer simulation without electric field compensation according to the second embodiment of the present invention.
Figure 7:
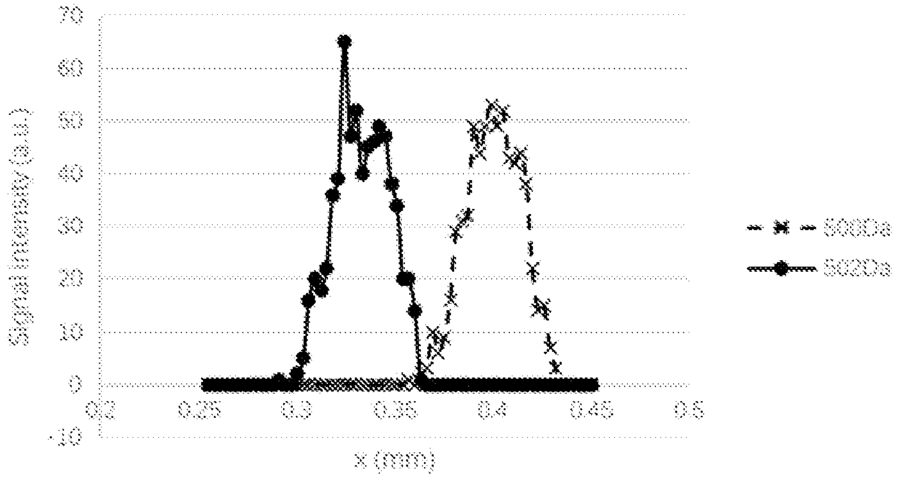
FIG. 7 is a schematic drawing showing a mass spectrum obtained from a computer simulation using electric field compensation according to the second embodiment of the present invention.

FIGS. 6 and 7 show, by way of simulation, the technical effect of the cycloidal mass spectrometer according to the second embodiment of the present invention. FIG. 6 is a schematic drawing showing a mass spectrum obtained from computer simulation without electric field compensation according to the second embodiment of the present invention. FIG. 7 is a schematic drawing showing a mass spectrum obtained from a computer simulation using electric field compensation according to the second embodiment of the present invention. Two masses of ions (500 Da and 502 Da) were used in the simulations and after passing through the cycloidal mass analyzer 100 shown in FIGS. 4 and 5, a separation was generated in space and a mass spectral signal was formed in the detector 5. In FIGS. 6 and 7, the abscissa represents the position at which the ions fall in the detector 5 and the ordinate is the ion intensity. Without electric field compensation, i.e. $E_0=E_1=E_2$, the resulting resolution is low due to a reduction of around 3% in the magnetic field intensity at the outer of the ions' cycloidal trajectory 4, and ions of 500 Da and 502 Da cannot be baseline resolved. With electric field compensation, i.e., $E_0=1.06E_1=-2E_2$, the resolution is almost doubled, allowing baseline resolving of 500 Da and 502 Da ions. Note that $E_2$ needs to be penetrated to affect the electric field intensity at the ions' cycloidal trajectory 4 because the area where the ions' cycloidal trajectory 4 is located does not exceed the coverage area of the middle set of electrodes (the electric field corresponding to $E_0$), and therefore $E_2$ needs to be quite different from $E_0$ to have an obvious effect on the ion trajectory. In this example, it is necessary to make $E_2=-0.5E_0$ in order to have a nearly 6% reduction in the electric field intensity of the fringe field.

Third Embodiment

Figure 8:
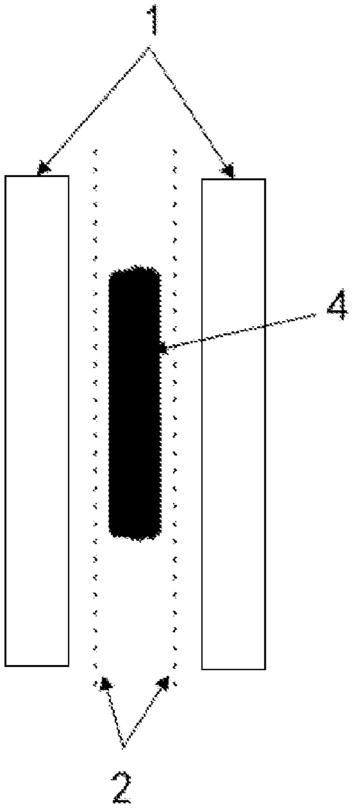
FIG. 8 is a schematic view showing the configuration of a cycloidal mass spectrometer in the plane yz according to a third embodiment of the present invention.
Figure 9:
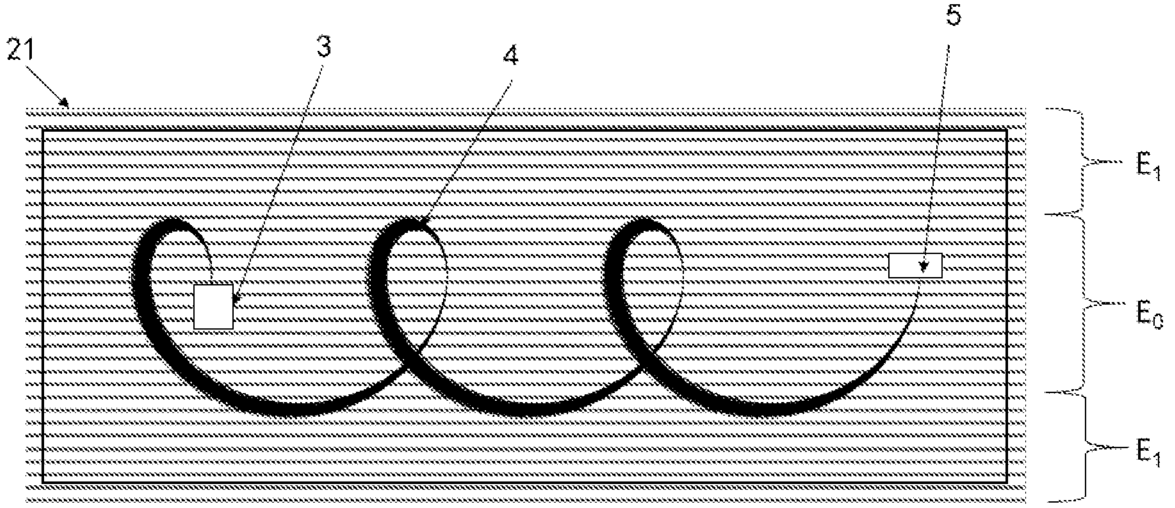
FIG. 9 is a schematic view showing the configuration of a cycloidal mass spectrometer in the plane xy for multiple periods of motion according to the third embodiment of the present invention.

Referring to FIGS. 8 and 9, a third embodiment of the present invention provides a cycloidal mass analyzer which differs from the first and second embodiments in that the ions' cycloidal trajectory 4 is a cycloidal trajectory of multiple cycles (or periods). The resolution of the cycloidal mass spectrometer is increased per cycle of ion movement, and cycloid trajectories over multiple cycles are advantageous to significantly increase the resolution of the cycloidal mass spectrometer.

Figure 10:
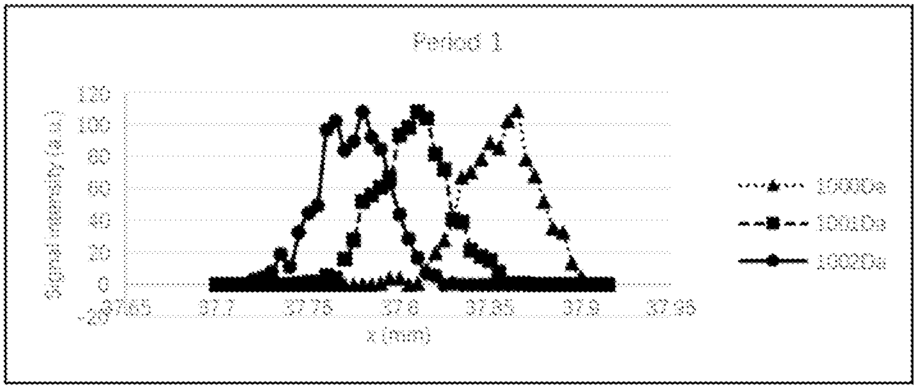
FIG. 10 is a schematic drawing showing a mass spectrum obtained by one cycle of a computer simulation of an ion without electric field compensation according to the third embodiment of the present invention.
Figure 11:
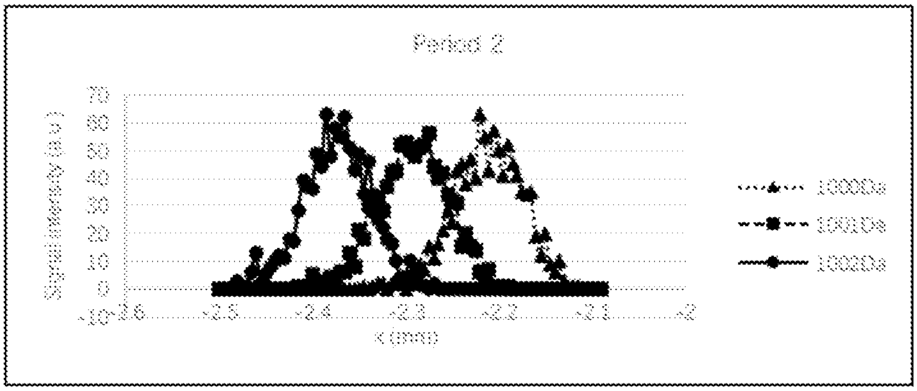
FIG. 11 is a schematic drawing showing a mass spectrum obtained from a two-cycle computer simulation of an ion without electric field compensation according to a third embodiment of the present invention.
Figure 12:
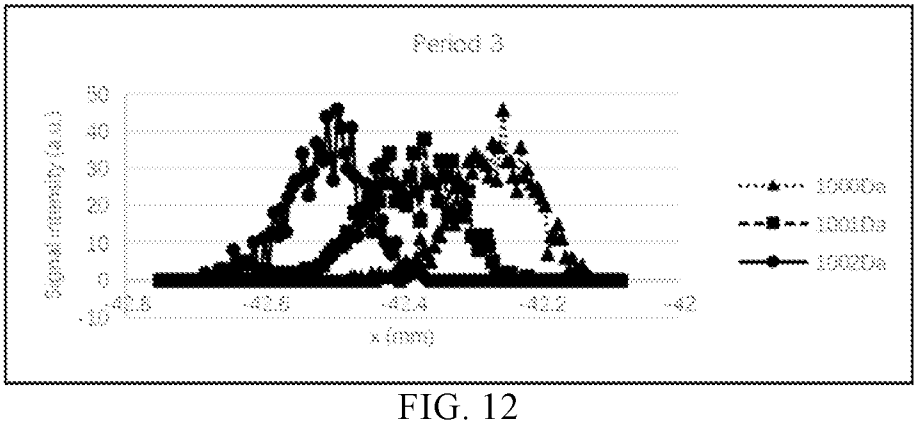
FIG. 12 is a schematic drawing showing a mass spectrum obtained from a three-cycle computer simulation of ions without electric field compensation according to the third embodiment of the present invention.
Figure 13:
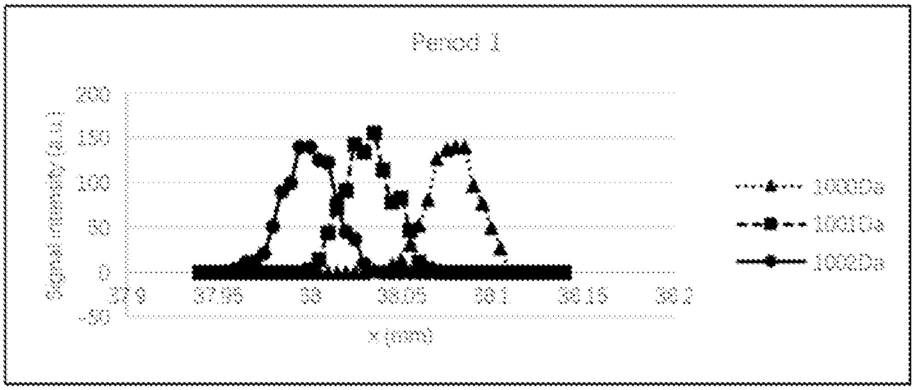
FIG. 13 is a schematic drawing showing a mass spectrum obtained from one cycle of a computer simulation of ions using electric field compensation according to the third embodiment of the present invention.
Figure 14:
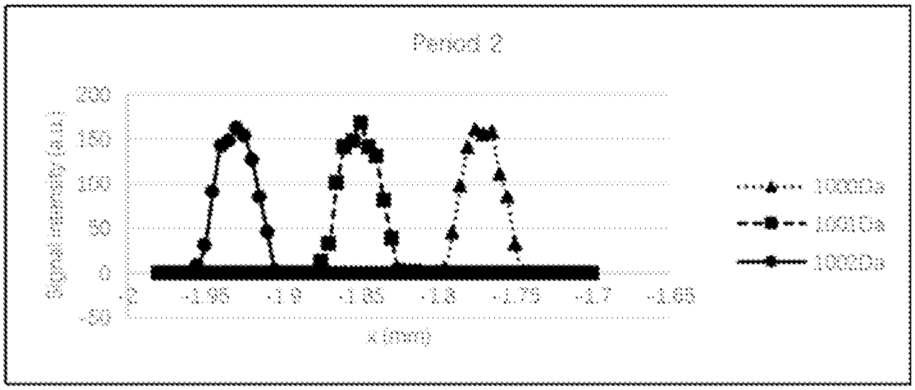
FIG. 14 is a schematic drawing showing a mass spectrum obtained from a two-cycle computer simulation of ions using electric field compensation according to the third embodiment of the present invention.
Figure 15:
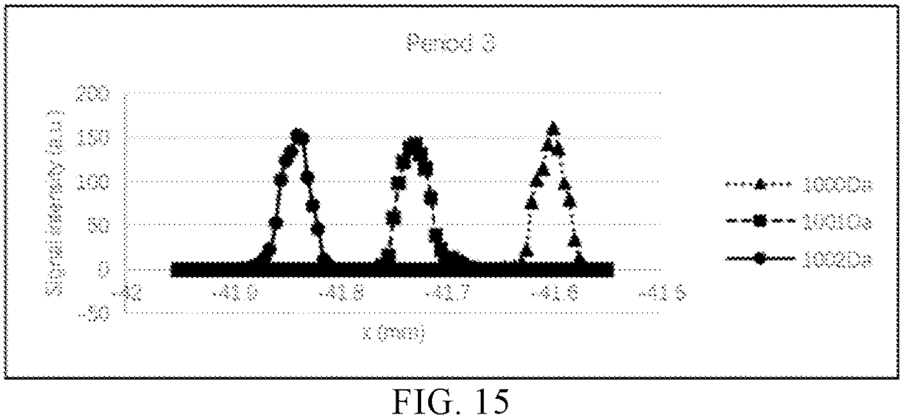
FIG. 15 is a schematic drawing showing mass spectrum obtained form a three-cycle computer simulation of ion using electric field compensation according to the third embodiment of the present invention.

In the case where the uniformity of the magnetic field and the electric field is guaranteed, a long period of ion movement is beneficial to improve the resolution; in multi-cycle motion, however, the sensitivity is significantly reduced due to axial diffusion; moreover, the multi-cycle motion obviously requires a larger volume of magnet 1 for movement of the ions. Whereas in the embodiment of the present invention, since the electric field intensity and the magnetic field intensity are simultaneously reduced, the electric field can compensate for the ion beam spreading due to the magnetic field non-uniformity and improve the resolution, therefore, the magnet 1 can be used with a relatively small volume while guaranteeing higher resolution and sensitivity. As shown in FIG. 8, the size of the magnet 1 is only 130 mm*40 mm*10 mm, with 3 cycles (or periods) of ion movement. The electric field compensation is performed only in the y-direction, i.e. the electric field intensity of the central area of the ion trajectory in the y-direction is set to $E_0$ and that of the outer areas are set to $E_1$. FIG. 10, FIG. 11 and FIG. 12 are a schematic drawing showing a mass spectrum obtained by computer simulation of ions with different cycles (or periods) without electric field compensation. FIGS. 13, 14 and 15 are a schematic drawing showing a mass spectrum obtained by computer simulation of ions with electric field compensation with different cycles (or periods). It can be seen that without the electric field compensation, i.e. $E_0=E_1$, there is no improvement in resolution as the number of cycles increases, because of that the non-uniformity of the magnetic field, although capable of confining the ions, destroys the resolution; whereas in the case of electric field compensation, i.e. $E_0=1.04\ E_1$, the resolution improves significantly as the number of cycles increases, without any loss in sensitivity. In this embodiment, after three cycloidal cycles, the resolution reaches 3740 for 1000 Da ions. In practical wide mass range (m/z range) applications, a slit can be added to each focusing spot to avoid interference with ions of different masses over a wide range, and the width of these slits need not be narrow so that sensitivity is not lost. In summary, the cycloidal mass spectrometers of the embodiments of the present invention have excellent stability and quantitation capability, in terms of resolution, sensitivity or mass range, and are far superior to conventional cycloidal mass spectrometers, and are able to perform as well as conventional bench-top ion trap mass spectrometers, quadrupole mass spectrometers, and the like.

Fourth Embodiment

Figure 16:
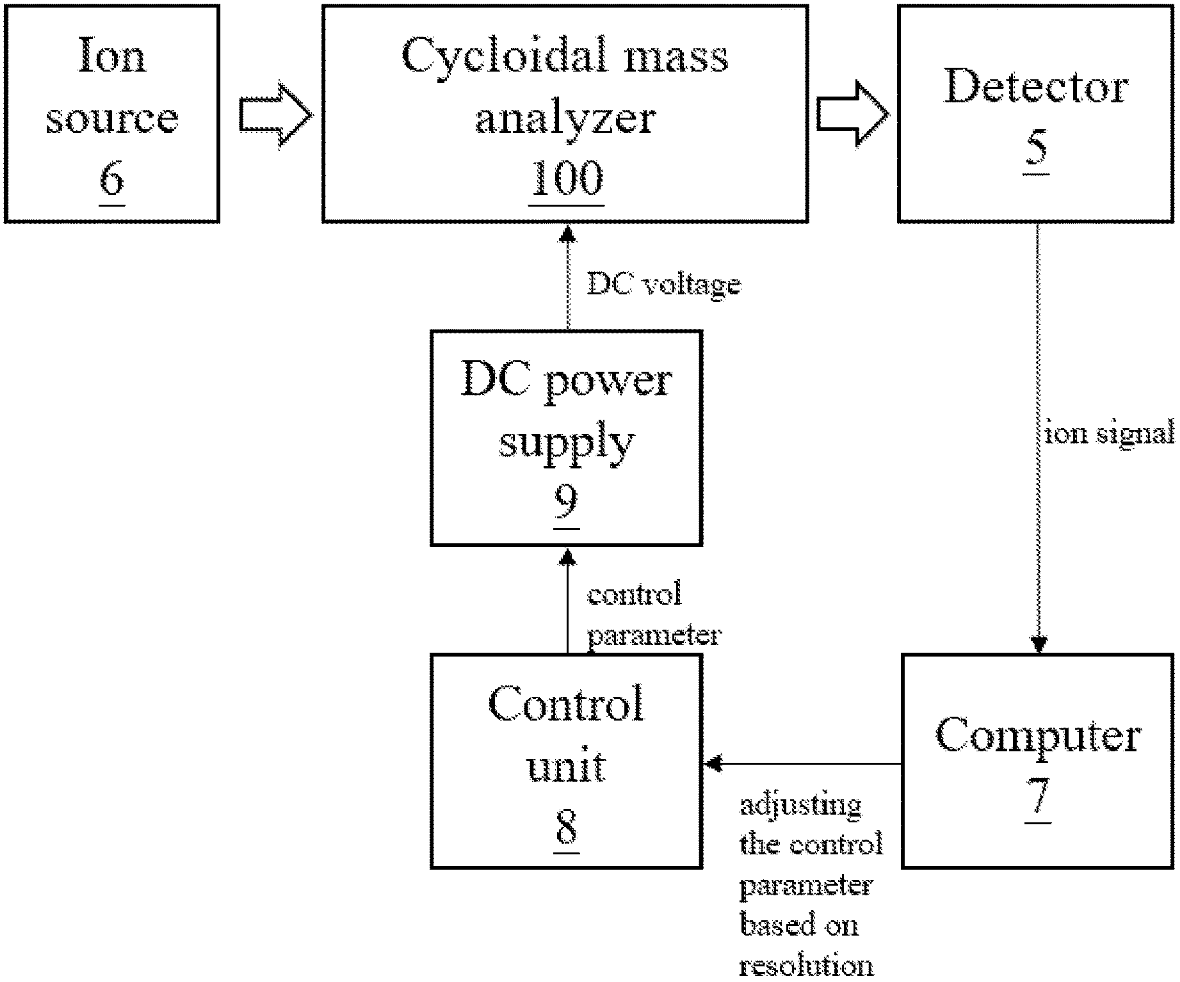
FIG. 16 is a schematic view showing the structure of a cycloidal mass spectrometer according to a fourth embodiment of the present invention.

Referring to FIG. 16, a fourth embodiment of the present invention provides a cycloidal mass spectrometer comprising an ion source 6 upstream of an ion injection unit 3 and a detector 5 downstream of a cycloidal mass analyzer 100. The ion source 6 generates ions to be analyzed, which enter the cycloidal mass analyzer 100 for mass analysis, i.e., the ions will be spatially separated in the E×B field because of different trajectories, and finally arrive at the detector 5 to generate ion signals. The ion signal in the detector 5 is transmitted to the computer 7 and a data processing is conducted to form a mass spectrum. In this embodiment, the DC voltage values of the respective strip electrodes 21 of the electrode array 2 in the cycloidal mass analyzer 100 can be dynamically adjusted according to the resolution of the mass spectrum in the computer 7 to further adjust the resolution of the spectrum until the resolution reaches a predetermined desired value. For example, the cycloidal mass spectrometer further comprises a control unit 8 for dynamically adjusting the resolution of the mass spectrum, and the ion signal detected by the detector 5 is transmitted to a computer 7 for obtaining the mass spectrum, and the control unit 8 adjusts the value of the DC voltage applied to the electrode array 2 according to the resolution of the mass spectrum until the resolution of the cycloidal mass spectrometer reaches a predetermined value. This process of dynamic adjustment is an automatic tuning of the instrument, commonly used by multi-parameter tuning algorithms such as annealing algorithms, genetic algorithms, PSO algorithms, and the like.

Figure 17:
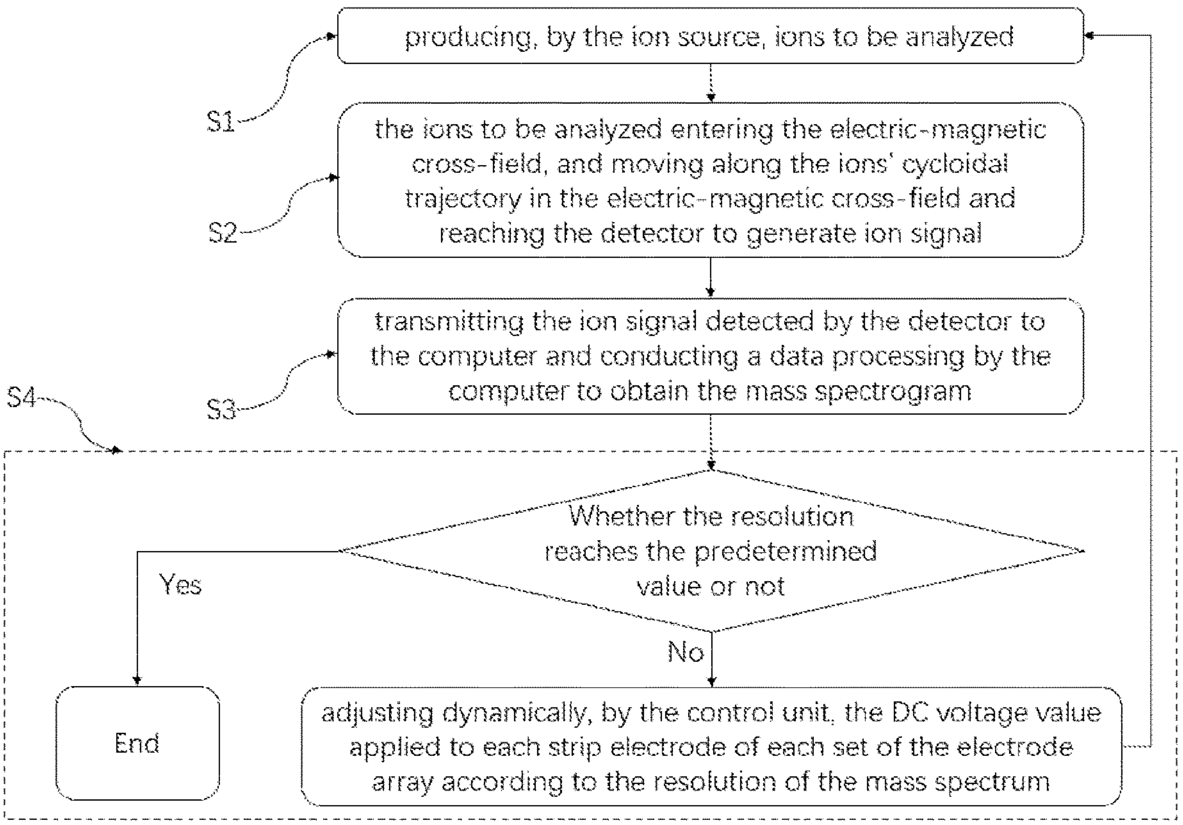
FIG. 17 illustrates a method for adjusting resolution of a cycloidal mass spectrometer in the fourth embodiment of the present invention.

Referring to FIG. 17, the present invention provides a method for adjusting resolution of a cycloidal mass spectrometer, comprising the steps of:

S1: producing, by the ion source 6, ions to be analyzed;

S2: the ions to be analyzed entering the electric-magnetic cross-field, and moving along the ions' cycloidal trajectory 4 in the electric-magnetic cross-field and reaching the detector 5 to generate ion signal;

S3: transmitting the ion signal detected by the detector 5 to the computer 7 and conducting a data processing by the computer 7 to obtain the mass spectrum;

S4: adjusting dynamically, by the control unit 8, the DC voltage value applied to each strip electrode 21 of each set of the electrode array 2 according to the resolution of the mass spectrum, and returning to Step S1 until the resolution reaches the predetermined value.

While the present invention has been described with reference to the preferred embodiments, it is not intended to limit the present invention, and it is intended to cover various modifications, equivalents, and improvements within the spirit and principles of the present invention.

What is claimed is:

1. A cycloidal mass spectrometer, characterized by comprising:

a set of magnets, providing a magnetic field;

two sets of electrode arrays, opposing to each other parallelly, each set of the electrode array including a plurality of strip electrodes arranged parallelly;

at least one DC power supply, providing DC voltages to each set of the electrode array to form a DC electric field, the direction of the electric field being perpendicular to the direction of the magnetic field, and the electric field and the magnetic field superimposed on each other to form an electric-magnetic cross-field;

an ion injection unit, configured to inject ions into the electric-magnetic cross-field, wherein said ions travel along a cycloidal trajectory in the electric-magnetic cross-field, in which the magnetic field intensity and the electric field intensity decrease simultaneously within at least part of the region in said cycloidal trajectory.

2. The cycloidal mass spectrometer of according to claim 1, characterized in that, in the direction from central region to outer region of the ions' cycloidal trajectory, relative non-uniformity of the electric field formed by reduction of the electric field intensity is higher than relative non-uniformity of the magnetic field formed by reduction of the magnetic field intensity.

3. The cycloidal mass spectrometer of claim 2, characterized in that, the relative non-uniformity of the electric field is twice of that of the magnetic field.

4. The cycloidal mass spectrometer of claim 1, characterized in that, the magnets are magnetic poles of a pair of permanent magnets, and each of the magnetic poles has a length of no more than 150 mm, a width of no more than 150 mm and a thickness of no more than 20 mm.

5. The cycloidal mass spectrometer of claim 4, characterized in that, each of the magnetic poles has a length of no more than 60 mm, a width of no more than 60 mm and a thickness of no more than 15 mm.

6. The cycloidal mass spectrometer of to claim 1, characterized in that, the electric field intensity in the outer region of the ions' cycloidal trajectory is lower than that in the central region of the ions' cycloidal trajectory.

7. The cycloidal mass spectrometer of claim 6, characterized in that, each set of the electrode array is segmented along the elongated strip electrodes, and the electric field intensity varies in the direction of the electric field by means of applying different DC voltages to segments of the electrode array.

8. The cycloidal mass spectrometer of claim 1, characterized in that, the cycloidal trajectory is a cycloidal trajectory having a plurality of periods.

9. The cycloidal mass spectrometer of claim 8, characterized by further comprising a plurality of slits arranged in the ions' cycloidal trajectory.

10. The cycloidal mass spectrometer of claim 1, characterized by further comprising an ion source located upstream of the ion injection unit, and a detector located downstream of the ions' cycloidal trajectory.

11. The cycloidal mass spectrometer of claim 10, characterized by further comprising:

a control unit for adjusting dynamically the resolution of a mass spectrum, by which after obtaining the mass spectrum by transmitting the ion signal detected by the detector to a computer, adjusting the DC voltage value applied to the electrode array by the control unit according to the resolution of the mass spectrum, until the resolution of the cycloidal mass spectrometer reaches a predetermined value.

12. A method for adjusting resolution of the cycloidal mass spectrometer of claim 11, characterized by comprising following steps:

S1: producing, by the ion source, ions to be analyzed;

S2: the ions to be analyzed entering the electric-magnetic cross-field, and moving along the cycloidal trajectory in the electric-magnetic cross-field and reaching the detector to generate ion signal;

S3: transmitting the ion signal detected by the detector to the computer and conducting a data processing by the computer to obtain the mass spectrum;

S4: adjusting dynamically, by the control unit, the DC voltage value applied to each strip electrode of each set of the electrode array according to the resolution of the mass spectrum, and returning to Step S1 until the resolution reaches the predetermined value.

* * * * *